United States Patent [19]

Harris

[11] Patent Number: 5,489,831
[45] Date of Patent: Feb. 6, 1996

[54] PULSE WIDTH MODULATING MOTOR CONTROLLER

[75] Inventor: William A. Harris, Coon Rapids, Minn.

[73] Assignee: Honeywell Inc., Minneapolis, Minn.

[21] Appl. No.: 122,872

[22] Filed: Sep. 16, 1993

[51] Int. Cl.$^6$ ............................................. H02P 7/00
[52] U.S. Cl. ............................................. 318/701; 318/254
[58] Field of Search .................................. 318/700, 701, 318/254, 138, 439; 388/804, 805, 515, 815, 819, 840, 911, 912, 917, 930

[56] References Cited

U.S. PATENT DOCUMENTS

| | | | |
|---|---|---|---|
| 3,436,635 | 4/1969 | James et al. . | |
| 3,560,827 | 2/1971 | Schiller | 388/805 X |
| 3,569,805 | 3/1971 | Hammond . | |
| 3,753,067 | 8/1973 | Milligan | 388/805 X |
| 4,186,334 | 1/1980 | Hirata . | |
| 4,300,081 | 11/1981 | Van Landingham . | |
| 4,335,343 | 6/1982 | Dreiseitl et al. . | |
| 4,338,558 | 7/1982 | Okamatsu et al. . | |
| 4,386,300 | 5/1983 | Ogawa | 388/840 X |
| 4,456,859 | 6/1984 | Watanabe et al. | 388/815 X |
| 4,465,961 | 8/1984 | Landino . | |
| 4,482,850 | 11/1984 | Sonoda et al. | 388/815 X |
| 4,546,293 | 10/1985 | Peterson et al. . | |
| 4,599,545 | 7/1986 | Moriki et al. . | |
| 4,602,201 | 7/1986 | Edwards . | |
| 4,617,675 | 10/1986 | Ashikaga et al. . | |
| 4,625,156 | 11/1986 | Komiya et al. | 388/805 X |
| 4,670,696 | 6/1987 | Byrne et al. | 318/701 |
| 4,695,778 | 9/1987 | Chito et al. | 388/819 X |
| 4,734,628 | 3/1988 | Bench et al. . | |
| 4,739,230 | 4/1988 | Sonobe et al. | 318/138 X |
| 4,800,327 | 1/1989 | Fujioka et al. . | |
| 4,843,288 | 6/1989 | Volz et al. . | |
| 4,897,583 | 1/1990 | Rees . | |
| 4,924,168 | 5/1990 | Horie et al. . | |
| 5,072,166 | 12/1991 | Ehsani . | |
| 5,208,740 | 5/1993 | Ehsani . | |

FOREIGN PATENT DOCUMENTS

| | | |
|---|---|---|
| 0253787 | 1/1988 | European Pat. Off. . |
| 2264407 | 8/1993 | United Kingdom . |

*Primary Examiner*—Jonathan Wysocki
*Attorney, Agent, or Firm*—Paul H. McDowall

[57] ABSTRACT

A pulse width modulation controller particularly useful for a variable speed variable torque electric motor. Inputs to the controller are a desired RPM signal, a motor electrical signal which is a function of the RPM of the rotor of the motor and its angular position relative to the stator, and a torque feed back signal derived from the power phase winding circuits of the motor. The controller produces pulse width modulated power drive signals which are applied to power switches of the power phase winding circuits of the motor to allow electric current to flow through the power phase winding circuits when power phase enable signals produced by the controller sequentially enable the power switch of a power phase winding circuit to do so. The duty cycle of the power drive signals is a function of the difference between the desired and actual RPM of the motor and the torque of the motor. The frequency of the power drive signals is a fixed integral multiple of the frequency of the power phase enable signals over the full operating range of RPMs of the motor.

20 Claims, 6 Drawing Sheets

PULSE WIDTH MODULATING MOTOR CONTROLLER

BACKGROUND OF THE INVENTION

1. Field of the Invention

This invention is in the field of motor controllers for electric motors, particularly those with variable speed and variable torque, such as switched reluctance, or SR, motors and permanent magnet, or PM motors, but is not limited to such motors; and more particularly relates to improvements in controlling the pulse width modulation (PWM) of the power drive signals that determine the speed and torque of variable speed electric motors.

2. Description of Related Art

Recent developments in power semiconductor devices such as power MOPPETS and insulated gate thyristors (IGT)s have led to the development of electronically commutated motors for use in applications requiring variable speed drive motors. Common examples of the types of electric motors the speed and torque of which are controlled by controllers which pulse width modulate the current flow through the power phase winding circuits of such motors, are SR motors and PM motors; however, the controller of this invention can be used with any electric motor that can be controlled by pulse width modulating the flow of electrical current through the motor's power phase windings. The cost and reliability of the pulse width modulation (PWM) controllers for electric motors compare favorably with those of more conventional controllers for variable speed motors.

Motors such as SR motors and PM motors conventionally have multiple poles on both the stator and rotor. In a SR motor, there are power phase windings on the stator poles, but no windings or permanent magnets on the rotor. Each pole of each pair of diametrically opposite stator poles of a SR motor have series connected windings that form an independent power phase winding. In a PM motor, permanent magnets are usually mounted on the rotor.

Torque to rotate the rotor is produced by switching current into each of the power phase windings in a predetermined sequence that is synchronized with the angular position of the rotor, to polarize an associated pair of stator poles. While generally the power phase windings are placed on poles of the stator, they can be placed on poles of the rotor if so desired. The resulting magnetic force attracts the nearest pair of rotor poles. In a SR motor, current is switched off in each power, or stator, phase winding before the poles of the rotor nearest the excited stator poles rotate past the aligned position. In such motors, the torque developed, while a function of the magnitude of the current flow in the stator windings, is independent of the direction of current flow so that unidirectional current pulses synchronized with the rotation of the rotor can be applied to the stator power phase windings by a convertor using unidirectional current switching elements such as thyristors or power transistors. The desired commutation of current through the stator phase windings can be accomplished by producing a rotor position signal by means of a shaft position sensor; i.e., an encoder, or resolver, for example, which is driven by the motor's rotor. The rotor position signal is applied to the motor controller.

The motor controller also typically has applied to it a signal indicating the desired direction of rotation of the rotor and a speed set signal indicating the desired angular velocity of the rotor which is typically measured in revolutions per minute (RPM). Such speed and direction signals may be controlled by a human operator or, more effectively, an automated control system. In addition, a rotor position signal, which is also known as the motor electrical (Me) signal; and a torque, or current, feedback signals are also applied to the motor controller. Current for each of the power phase windings of a SR motor is derived from a unidirectional power source, and each of the power phase windings is connected in series with a power transistor to control the flow of current through its associated power phase winding. The motor controller produces pulse width modulation (PWM) power drive signals which are applied to the power transistors to turn them on and off. The timing of such current flows relative to the position of the rotor causes the rotor to rotate, and the order in which the power phase windings are energized determines the direction of rotation of the rotor.

The power drive signals applied to the power transistors in series with power phase windings are pulse width modulated (PWM) to maintain current levels through the power phase windings at a level to cause the rotor to rotate at the desired RPM while limiting the torque, or current, in the power phase windings to a predetermined maximum. It should be noted that the magnitude of the torque of a motor is a function of the magnitude of the current flowing through its power phase winding circuits. The magnitude of this current flow is sensed and used to produce a current, or torque, feedback signal which is applied to the motor controller. A prior art circuit for pulse width modulating the power drive signal for a SR motor is illustrated in FIG. 9 of U.S. Pat. No. 5,196,775.

A problem with prior art PWM motor controllers is that there is no fixed relationship between the frequency of the PWM power drive signals and the motor electrical, Me, or power phase commutation signals which results in a beat frequency (PWM-Me) that causes fluctuations at this beat frequency in the speed and torque of the motor. Such fluctuations in and of themselves are undesirable, and in addition they also increase the noise produced by a motor in which such fluctuations occur.

SUMMARY OF THE INVENTION

The present invention provides a pulse width modulation controller for a variable speed variable torque electric motor in which the motor controller produces PWM power drive signals the frequency of which is a fixed integral multiple "n" of the frequency of the power phase commutation, or power phase enable, signals. These power phase enable signals determine the time period each power phase winding can be energized and the order, or sequence, in which they are energized which determines the direction of rotation of the rotor.

This invention provides a PWM controller for a variable speed and variable torque motor that produces PWM power drive signals, the frequency of which is a fixed integral multiple of the frequency of the power phase enable signals also produced by the controller.

This invention discloses a PWM controller for an electric motor in which the frequency of the PWM power drive signal is a fixed integral multiple of the power phase enable signal over the complete operating ranges for the RPM and the torque of the motor.

Further, this invention teaches a controller which reduces noise and variations in the speed and torque in a variable speed variable torque electric motor by maintaining constant the number of pulses of the PWM power drive signals controlling the flow of electrical current through each power phase winding circuit of a motor during the period of time that each power phase winding circuit can be energized.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be affected without departing from the spirit and scope of the novel concepts of the disclosure, and in which.

DESCRIPTION OF THE INVENTION

Figure 1:
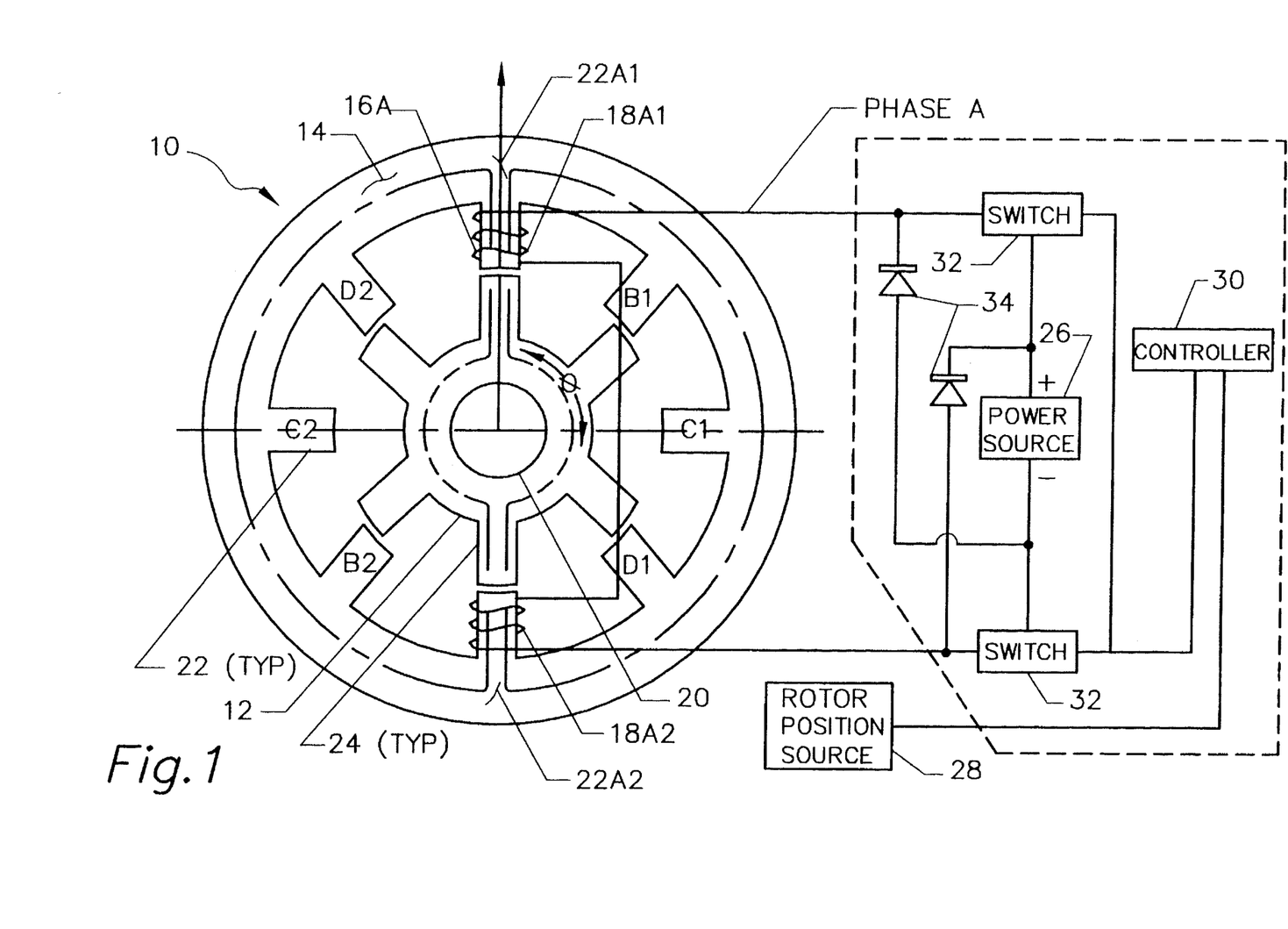
FIG. 1 is a schematic diagram of a prior art SR motor illustrating a conventional motor controller energizing a single stator phase winding of the motor.

For convenience, the operation of the pulse width modulation controller of this invention is described in conjunction with a switched reluctance motor. As pointed out above, the controller of this invention can be used with any type electric motor in which the speed and torque produced by the motor is controlled by pulse width modulation of the power flow through the power phase winding circuits of the motor such as a permanent magnet motor. Referring to FIG. 1, prior art SR motor 10 has a rotor 12 which has no windings, permanent magnets, or commutator. Stator 14 has a relatively small number of stator power phase windings 16 with only one such winding, 16A which includes a pair of series connected coils 18A1 and 18A2 being illustrated in FIG. 1. Rotor 12 is mounted on shaft 20 for rotation around an axis of rotation which coincides with the longitudinal axis of cylindrical shaft 20. Rotor 12 is preferably made from a plurality of laminations formed, or stamped, from sheets of a magnetically permeable steel alloy. Stator 14 likewise is preferably formed from a plurality of laminations made of a magnetically permeable steel alloy.

Stator 14, as illustrated in FIG. 1, has eight stator poles 22 and rotor 12 has six rotor poles 24. Coils 18 on diametrically opposite stator poles 22 are connected in series to form four power phase windings 16A, 16B, 16C, and 16D. For ease of illustration, phase windings 16B, 16C, and 16D are not shown in FIG. 1; instead, the stator poles associated with these phase windings are labeled "B" "C" and "D". In a SR motor, different combinations of numbers of stator and rotor poles may be used; for example, a six stator pole and a four rotor pole combination would constitute a three phase motor since it would have three stator power phase windings; and an eight stator pole and a six rotor pole motor would constitute a four phase motor since it would have four stator power phase windings. It should be noted that the number of stator and rotor poles is always an even number.

When a direct current flows through stator power phase winding 16A, both the stator 14 and the rotor 12 are magnetized. This produces a torque causing the rotor 12 to align a pair of its diametrically opposite poles 24 with the excited, or magnetized, stator poles 22A1 and 22A2. The polarity of the torque does not depend on the polarity of the current since the rotor 12 is always attracted to the stator 14 and rotates to an orientation that provides a minimum reluctance path between energized poles. Thus, a SR motor requires only unipolar current through its power phase windings from power source 26. Sequential excitation of the phase windings 16A–16D causes rotor 12 to rotate by synchronously aligning a pair of rotor poles 24 with the stator poles 22 whose power phase winding 16 are energized, or excited. While the power phase windings are typically sequentially energized with one phase being turned off concurrent with the next phase being turned on, the energization of the power phase windings may overlap with the succeeding phase being energized before the preceding phase is deenergized. Rotor position sensor 28 provides controller 30 with information as to the position of rotor 12 relative to stator 14 necessary for synchronization of the rotation of rotor 12 and the sequential excitation, or energization, of stator power phase windings 16A–16D.

In FIG. 1, only a basic electrical circuit for energizing stator power phase winding, or phase, 16A is illustrated. Similar circuitry is provided for phases 16B–16D, but are not illustrated. When switch pair 32 are closed, an electrical current builds up in phase 16A from DC power source 26. When switch pair 32 are opened, the current transfers to diodes 34 which quickly remove and recover any stored energy as the result of energizing phase 16A.

Rotor 12 rotates in the opposite direction to the sequence in which stator phase windings 16A–16D are energized, or excited. Current pulses through phase windings 16A–16D are controlled by controller 30 in response to motor electrical (Me) timing signals produced by rotor position sensor 28 and are timed to occur at specific angles "q" of rotor 12. Thus, the commutation of the current through stator phase windings 16A–16D occur at specific rotor angles q with the object being to produce a relatively smooth rotational transition of a rotor pole 24 past an attracting stator pole 22. To accomplish this, each power phase winding is substantially deenergized before the attracting stator poles and the attracted rotor poles align.

The timing of when energizing current pulses flow through a stator power phase winding and the duration of such a period, is determined by controller 30 which produces power phase commutation, or power phase enable, signals which are a function of the rotor angle q and the RPM of the motor. The magnitude of the currents in the stator phase windings is controlled by pulse width modulating (PWM) the energizing current flowing through a given power phase winding while that power phase winding is enabled by a power phase enable signal, or pulse.

Figure 2:
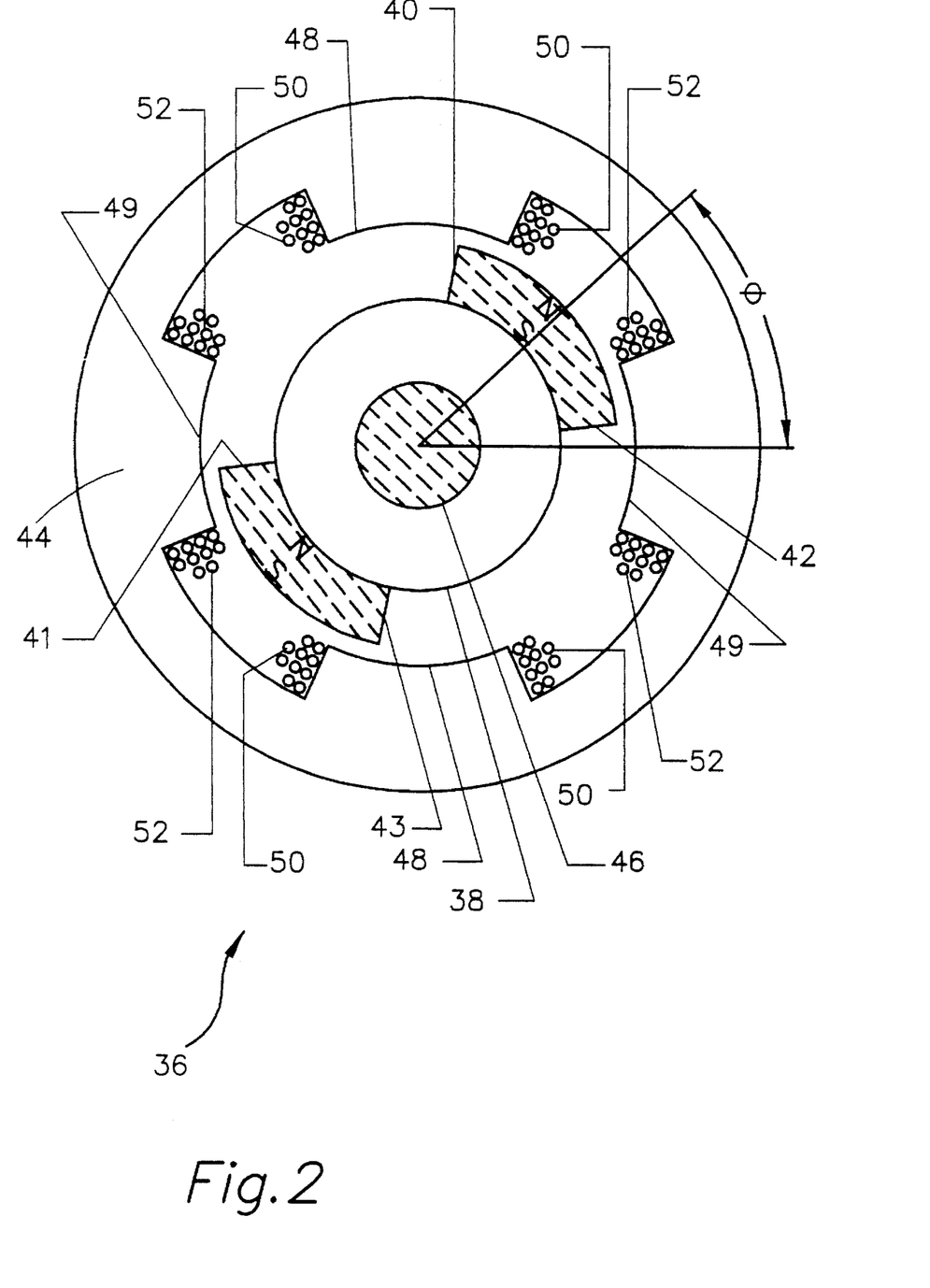
FIG. 2 is a schematic cross section through a prior art PM motor.

Referring to FIG. 2, prior art PM motor 36 has a rotor 38 on which are mounted two diametrically opposed permanent magnets 40, 41 with magnets 40 and 41 constituting rotor poles 42, 43. Rotor 38 is positioned within stator 44 for rotation with respect to the longitudinal axis of shaft 46 on which rotor 38 is mounted. Stator 44 in the embodiment illustrated in FIG. 2 is provided with two sets of diametrically opposed stator poles 48, 49. Stator 44 has two stator power phase windings 50, 52 with each of the windings 50, 52 including a pair of series connected coils. Since PM motor 36 has a total of four stator poles, it is a two phase motor. Other than having permanent magnets mounted on rotor 38, different numbers of stator and rotor poles, and the need to reverse the direction of current flow through the power phase windings 50, 52 each time the current is commutated. For additional information concerning PM motors, reference is made to "D.C. Motors, Speed Control, and Servo Systems; Engineering Handbook; published by Electrocraft Corp.; 3rd. Edition, 1975.

Figure 3:
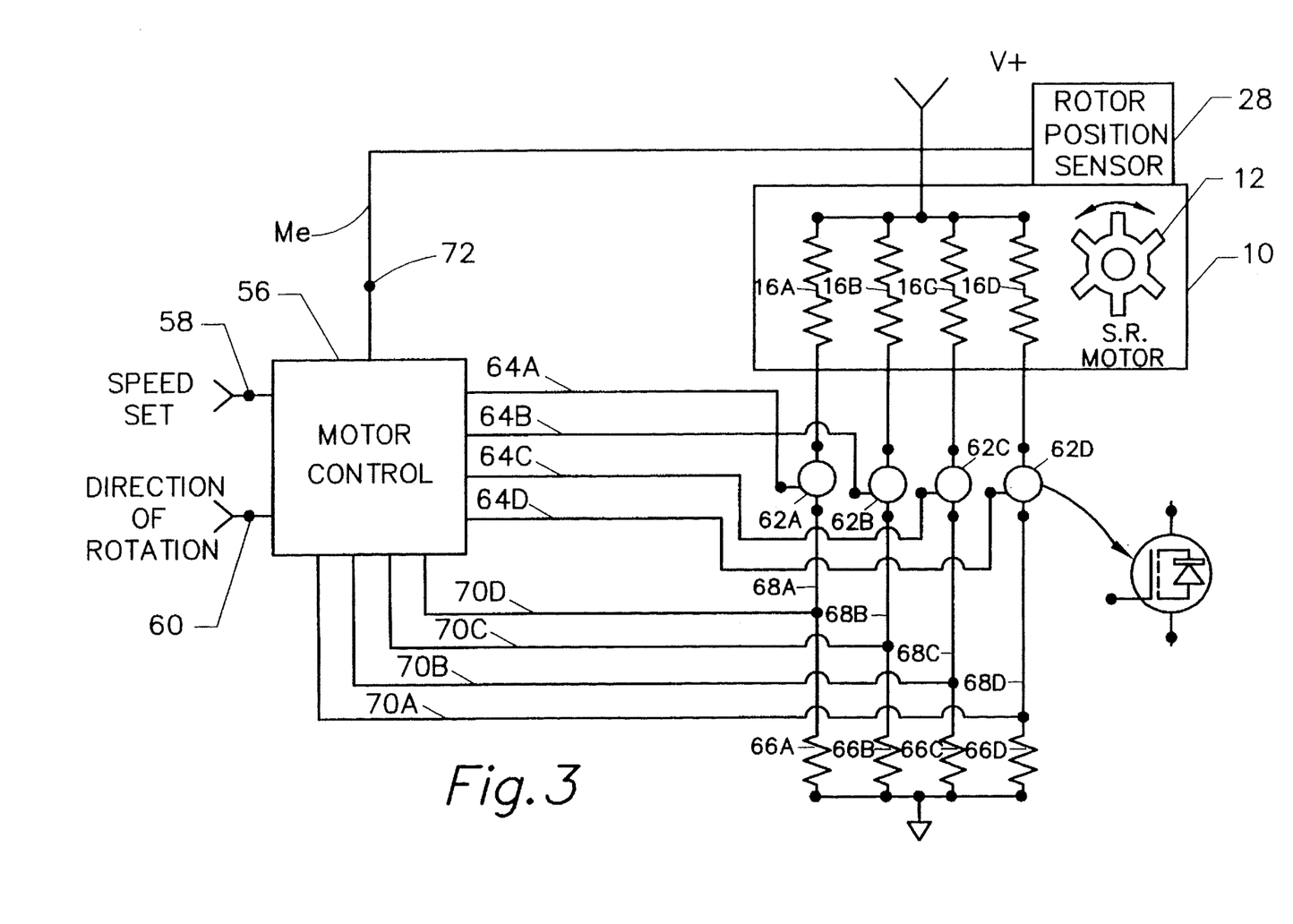
FIG. 3 is schematic block diagram of a motor controller incorporating the invention for a SR motor.

In FIG. 3, motor 10, its rotor 12, stator, power phase windings, and rotor position sensor are essentially the same as illustrated in FIG. 1. Motor controller 56 has applied to its input terminal 58 a speed set signal, a DC voltage, which is a function of the desired RPM of rotor 12 of motor 10, and to input terminal 60 a direction of rotation signal the polarity of which represents the desired direction of rotation of rotor 12. Electric current for energizing the coils of each of the power phase windings 16A–16D is derived from power source V+. Each of the power phase windings 16A–16D is connected in series with one of the power switches 62A–D, which are preferably power MOPPETS. Motor controller 56 produces PWM power drive signals at output terminals 64A–D which are applied respectively to power switches 62A–D. The "on" portion of each pulse of the power drive signal turns on the power switch 62 to which it is applied permitting current to flow through the power phase winding connected in series with the power switch as well as through the one of resistors 66A–D connected in series with each of the power switches 62A–D. Power phase winding 16A, power switch 62A, and resistor 66A collectively form power phase winding circuit 68A. Similarly power phase windings circuits 68B–D are each made up of a series connected power phase winding, a power switch, and a resistor.

The voltage drop across each of the resistors 66A–D is proportional to the magnitude of the current flowing through its respective power phase winding circuit 68A–D and provides a measure of the magnitude of the current in any one of the phase windings at any given instant in time. The voltages across resistors 66A–D, constitute a power phase current, or torque feedback, signal, and are applied respectively to input terminals 70A–D of motor controller 56.

Rotor position sensor 28 which can be an encoder, or resolver, for example, produces the motor electrical (Me) signal the timing of the signals of which is a function of the angular position of rotor 12 with respect to stator 14, and the frequency of which is a function of the number of revolutions per minute (RPM) of rotor 12 multiplied by the number of rotor poles 24, six in the preferred example. The Me signal is applied to input terminal 72 of motor controller 56.

Figure 4:
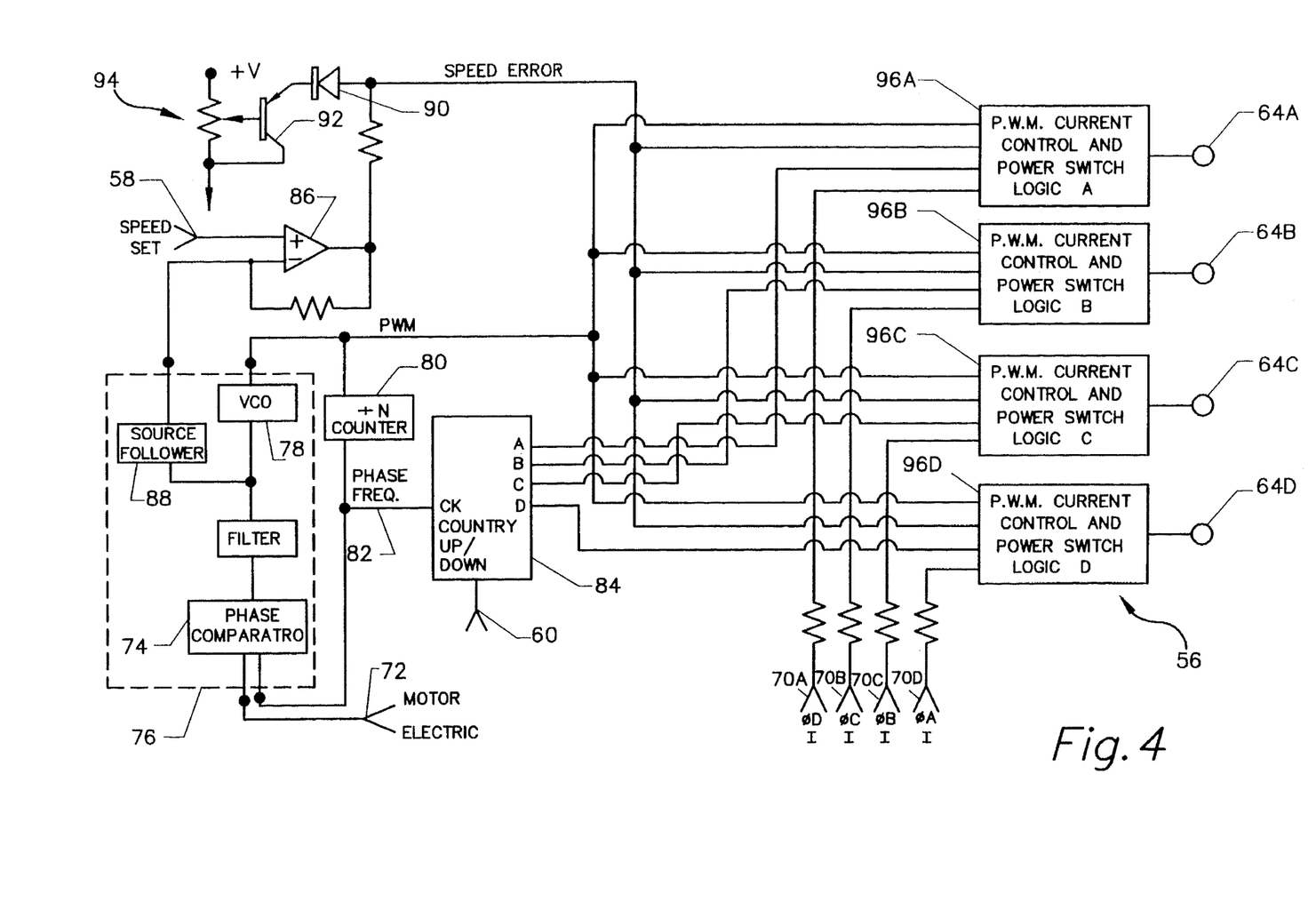
FIG. 4 is a block diagram of the motor controller of FIG. 3.

In FIG. 4, which is a block diagram in greater detail of motor controller 56, the Me signal applied to input terminal 72 of controller 56 is applied to phase comparator 74 of phase-locked loop, (PLL) 76. The output of voltage controlled oscillator, VCO, 78 of PLL 76 is the pulse width modulation, PWM, signal used in generating pulse width modulated power drive signals that are applied to power transistor 62A–D through output terminals 64A–D of controller 56, as will be explained below. The PWM signals are also applied to "N" counter 80, the output of which is a power phase commutation signal. The output of N counter 80 is applied as the second input to phase comparator 74 and also to the clock input terminal 82 of up-down counter 84.

The outputs at terminals A–D of up-down counter 84, power phase enable signals, determine the period of time during which each power phase winding of motor 10 can be energized, and the sequence in which they are to be energized. Counter 84, depending on the polarity of the signal applied to it through direction of rotation terminal 60 can be sequenced to count up; i.e. A, B, C, D; or to count down; i.e., D, C, B, A. The direction of the count determines whether power phase windings 16A–16D are sequenced in a clockwise or counter clockwise direction, which in turn determines the direction of rotation of rotor 12. Thus, the motor direction command signal applied to input terminal 60 of controller 56 and thence to the up/down control terminal of counter 84 determines the direction of rotation of rotor 12 of motor 10.

The speed set signal, the magnitude of which is a function of the desired RPM of motor 10, is applied to input terminal 58 of controller 56 and to the positive input terminal of operational amplifier (op-amp) 86. The output of source follower 88 of PLL 76 is applied to the negative input terminal of op amp 86. The magnitude of the voltage produced by source follower 88 of PLL 76 is an actual motor speed voltage signal, and is a function of the instantaneous RPM of rotor 12. The output of op-amp 86, a speed error signal, is positive if the RPM of rotor 12 is less than that specified by the speed set signal and negative if greater. The circuit including diode 90, transistor 92, and potentiometer 94 limits the magnitude of positive speed error signals to limit the maximum current in the power phase windings which in turn limits the maximum torque of motor 10. The speed error signal and PWM signals are applied to each of the PWM current control and power switch logic circuits 96A–D. The phase enable signals present at the A–D output terminals of counter 84 are applied, respectively, to circuits 96A–D as are phase current feedback signals which are applied to input terminals 70A–D.

Figure 5:
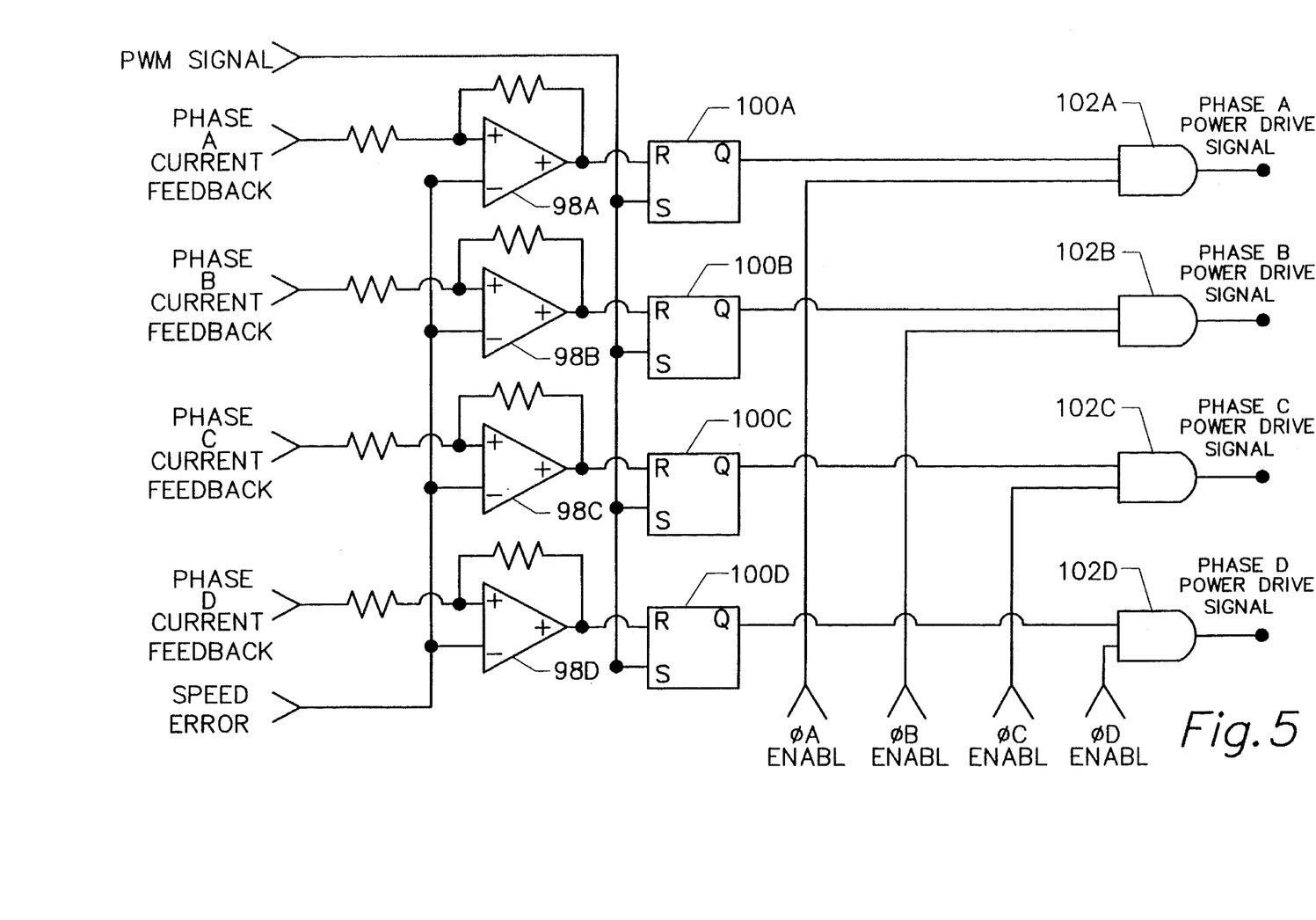
FIG. 5 is a block diagram of the PWM current control and power switch logic circuit of FIG. 4.

Referring to FIG. 5, each of the circuits 96A–D includes an op-amp 98A–D, a set-reset flip flop 100A–D, and an AND gate 102A–D. The PWM signals from PLL 76 are applied to the set terminal "S" of each of the flip flops 100A–D. The signal applied to the reset terminal "R" of flip flop 100A is the output of op-amp 98A of circuit 96A. The speed error signal from the circuit including op-amp 86 is applied to the negative input terminals of op-amps 98A–D, and the phase A current feedback signal, for example, is applied to the positive input terminal of op amp 98A.

When a pulse of the PWM signal applied to the set terminal S of flip flop 100A goes positive, the "Q" output of flip flop 100A goes high and remains so until the voltage at its reset terminal R reaches a value that resets flip flop 100A. The time period between when the Q output goes high and flip flop 100A is reset and the Q output goes low is determined by how long it takes for the output of op-amp 98A to reach the magnitude required to reset flip flop 100A. This is determined by the magnitude and polarity of the speed error signal and the magnitude of the Phase A current feedback signal applied to op amp 98A. The greater the magnitude of the phase A current the narrower the positive portion, or duty cycle, of the pulses at the Q output of flip flop 78. If the speed error is negative, the wider the positive portions and the greater the duty cycle of the pulses, and if the speed error is positive, the smaller the duty cycle.

The Q output of flip flop 100a is applied as one input to AND gate 102A. The other input to AND gate 102A is the phase A enable signal available at the A output terminal of counter 84. The output of AND gate 102A at terminal 64A is the Phase A power drive signal that is applied to power transistor 62A. The operations of circuits 96B, 96C, and 96D are substantially identical with that of circuit 96A as set forth above. The result of the operation of circuit 96A, for example, is that the duration of the power on portion, or duty cycle, of each pulse of the power drive signal applied to power switch 62A is a function of the speed error signal and the power phase current, or torque, feedback signals from power phase winding circuit 68A.

Figure 6:
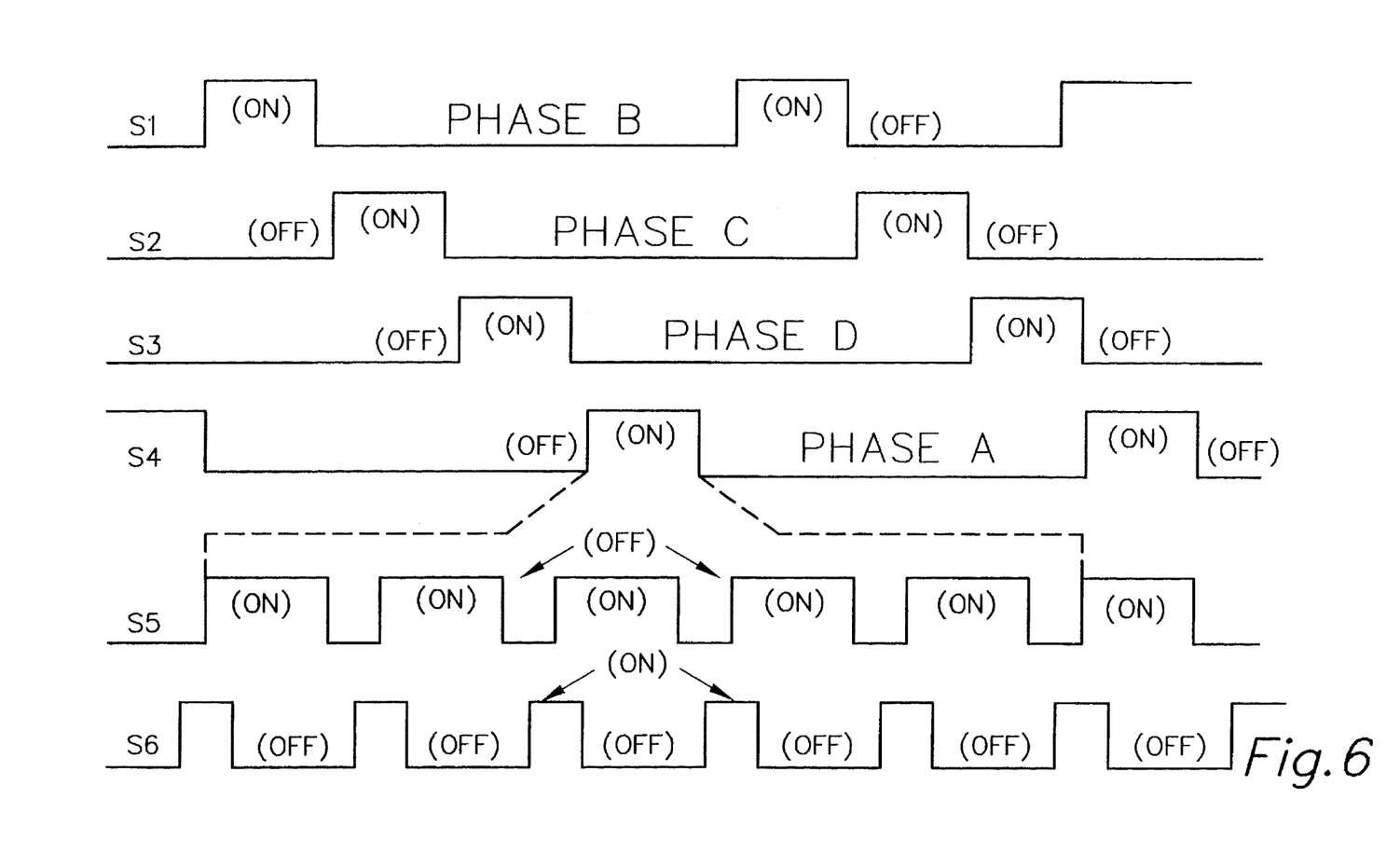
FIG. 6 is a timing diagram showing the relationship between pulses of the power phase enable signals and pulses of the PWM power drive signals.

In FIG. 6, signals S1, S2, S3, and S4 illustrate the timing of the A, B, C, and D power phase enable signals produced at the A. B, C, and D output terminals of counter 84. Thus, when the B power phase enable signal is positive, AND gate 102B in FIG. 5 is enabled so that PWM power drive signals present at the "Q" output of flip flop 100B are transmitted to the power transistor 62B of power phase winding circuit 68B. With respect to signal S5 and S6, the horizontal scale has been increased to better illustrate the shape and number of power drive pulses applied to power transistor 62A, for example, during the time period that the phase A enable pulse of S4 is positive, or on, and during which period AND gate 102A is enabled. Wave form S5 illustrates the width, or duration, of the power on portion, or duty cycle, of each phase A power drive signal applied to power drive transistor 62A while the phase A enable pulse is positive and in particular when motor 10 is driving a normal load. Wave form S6 illustrates the width of the power on portion of each phase A power drive signal when motor 10 is driving a small load.

It should be noted that the number of power drive signals applied to a power transistor of a stator phase winding during the period each phase winding is enabled by a phase enable signal is a constant integral, five in the illustrated embodiment, at any motor speed and at any loading or torque up to a predetermined maximum torque. Stated another way, the frequency of the power drive signals is a constant integral multiple of the frequency of the power enable, or power phase commutation, signals at any RPM of the motor. The limitation as to the maximum torque that motor 10 can generate prevents excessively large currents from flowing through the phase windings which could damage the motor.

Obviously many modification and variations of the present invention are possible in the light of the above teachings. It is therefore to be understood that within the scope of the appended claims the invention may be practiced other than as specifically described and illustrated.

What is claimed is:

1. A pulse width modulation controller for an electric motor having a rotor, a stator, and a plurality of power phase (winding) circuits with each power phase circuit including a power switch, and means for producing a motor electrical (Me) signal which is a function of the revolutions per minute (RPM) of the rotor of the motor and its position relative to the stator of the motor; comprising:

circuit means responsive to the Me signal produced by the motor for producing a pulse width modulation signal;

circuit means for producing power phase commutation signals the frequency of which has a fixed relationship to the frequency of said pulse width modulation signal, one power phase enable signal for each power phase winding circuit of the motor;

circuit means for producing a speed error signal, said speed error signal being a function of the difference between the actual RPM of the rotor and a desired RPM; and pulse width modulation (PWM) circuit means for producing power drive signals for application to the power switch of each of the power phase winding circuits when each power switch is enabled by a power phase enable signal to receive said power drive signals, the frequency of the power drive signals produced by said PWM circuit means being that of the pulse width modulation signal, and the duty cycle of the power drive signals being a function of the speed error signal and of a power phase feedback signal produced by a power phase winding circuit when a power drive signal is applied to the power switch to energize said circuit, said power phase winding circuits being energized in sequence.

2. The pulse width modulation controller of claim 1 in which the fixed relationship between the power phase commutation signal and the frequency of the pulse width modulation signal is that the frequency of the power phase commutation signal is equal to 1/n times the frequency of the pulse width modulation signal and "n" is a positive integer.

3. The pulse width modulation controller of claim 2 in which the electric motor is a variable reluctance motor having a rotor with "R" poles where "R" is an even integer and ME frequency equals the RPM of the rotor multiplied by R.

4. The pulse width modulation controller of claim 3 in which each power phase winding includes means for producing a power phase feedback signal.

5. The pulse width modulation controller of claim 1 in which the electric motor is a permanent magnet motor.

6. A pulse width modulation controller for an electric motor having a rotor, a stator, and a plurality of power phase winding circuits with each power phase circuit including a power switch, and means for producing a motor electrical (Me) signal which is a function of the revolutions per minute (RPM) of the rotor of the motor and its position relative to the stator of the motor; comprising:

circuit means responsive a Me signal produced by the motor for producing a pulse width modulation signal;

circuit means for producing a power phase commutation signal the frequency of which is 1/n times the frequency of said pulse width modulation signal, where "n" is an integer greater than one;

circuit means to which the said phase commutation signal is applied for producing power phase enable signals, one power phase enable signal for each power phase winding circuit of the motor;

circuit means for producing a speed error signal, said speed error signal being a function of the difference between the actual RPM of the rotor and a desired RPM; and a plurality of pulse width modulation (PWM) circuit means, each of the PWM circuit means being associated with one of the power phase winding circuits of the motor and for producing for its associated power phase winding circuit a power drive signal for application to the power switch of its associated power phase winding circuit when a power phase enable signal is applied to one of said PWM circuit means, the frequency of the power drive signals produce by said PWM circuit means being that of the pulse width modulation signal, and the duty cycle of the power drive signals being a function of the speed error signal and of a power phase feedback signal produced by each power phase winding circuit when a power drive signal is applied to the power switch of a power phase winding circuit to energize said circuit, said power phase winding circuit being energized in sequence to cause the rotor of the motor to rotate.

7. The pulse width modulation controller for a variable speed variable torque electric motor of claim 6 in which the rotor of the motor has "R" poles and the stator has "S" poles, where "R" and "S" are even integers, and the power phase winding circuits are positioned on the stator poles.

8. The pulse width modulation controller for a variable speed variable torque electric motor of claim 7 in which the electric motor is a variable reluctance motor and the frequency of Me equals the RPM of the rotor multiplied by R.

9. The pulse width modulation controller for a variable speed variable torque electric motor of claim 8 in which the integer "n" equals 5.

10. The pulse width modulation controller for a variable speed variable torque electric motor of claim 8 in which the electric motor is a permanent magnet motor.

11. A pulse width modulation motor controller for a variable speed and variable torque electric motor including a stator having a first set of "S" diametrically opposed stator poles, a rotor mounted within the stator for rotation about an axis of rotation, said rotor having a second set of "R" diametrically opposed rotor poles, where "S" and "R" are even integers, each pair of diametrically opposed poles of one of the set of poles having a series connected power phase winding, means for producing a pulsed motor electrical (Me) signal the timing of the pulses of which is a function of the angular position of the rotor with respect to the stator, the frequency of which is a function of the revolutions per minute (RPM) of the rotor, and the number of rotor poles; power switch means connected in series with each of the power phase windings for permitting electrical current to flow through a power phase winding in response to a power on portion of a pulse of a power drive signal being applied to the switch means thereof; and circuit means connected to each of the power phase windings for producing a current feed back signal which is a function of the current flowing through any of the power phase windings at any instant in time; said motor controller comprising:

first circuit means to which is applied the Me signal for producing a pulse width modulation (PWM) signal which is in phase with the Me signal, and a second signal that is a function the RPM of the rotor of the motor;

second circuit means to which is applied the voltage that is a function of the RPM of the rotor produced by the first circuit means, and a speed set voltage which is a function the desired RPM of the rotor for producing a speed error signal;

third circuit means to which is applied the PWM signal produced by the produced by the first circuit means for a power phase commutation signal, the frequency of which is 1/n times the frequency of the PWM signal applied thereto, where "n" is a positive integer greater than one;

fourth circuit means to which is applied the power phase commutation signal produced by the third circuit means for producing power phase enable signals, one for each power phase winding of the motor; and PWM current control and power switch logic means, one for each power phase winding of the motor to each of which is applied the speed error signal, the PWM signal, and to each of them respectively a power phase enable signal and a power phase current feed back signal, each of the PWM current control and power switch logic means for producing a pulse width modulated power drive signal having a duty cycle and a frequency the duty cycle of which is a function of the speed error signal and the current feed back signal and the frequency of which is "n" times the power phase enabling signal for application respectively to the power switch means connected in series with each power phase winding of the motor to control the electrical current flow sequentially through each of the power phase windings to cause the rotor to rotate.

12. The pulse width modulation motor controller of claim 11 in which a series connected power phase winding is placed around each pair of diametrically opposed stator windings.

13. The pulse width modulation motor controller of claim 12 in which "S" is greater than "R".

14. The pulse width modulation motor controller of claim 13 in which the first circuit means is a phase-locked-loop device.

15. The pulse width modulation motor controller of claim 14 in which the fourth circuit means is an up/down counter.

16. The pulse width modulation motor controller of claim 15 in which the electric motor is a variable reluctance motor.

17. The pulse width modulation motor controller of claim 15 in which the electric motor is a permanent magnet motor with permanent magnets positioned on the rotor.

18. A pulse width modulation controller for a switched reluctance motor; said motor having a stator having eight diametrically opposed stator poles; a rotor mounted within the stator for rotation about an axis of rotation, said rotor having six diametrically opposed rotor poles; each pair of diametrically opposed stator poles having a series connected power phase winding forming four stator power phase windings; means for producing a motor electrical (Me) signal the timing of the pulses of which is a function of the angular position of the rotor with respect to the stator, and the frequency of which is a function of the revolutions per minute (RPM) of the rotor multiplied by the number of rotor poles; power switch means connected in series with each of the stator phase windings for controlling flow of electrical current through each power phase winding in response to a power on portion of each pulse of a power drive signal applied to the switch means thereof; and circuit means connected to the stator power phase windings for producing a torque feedback signal which is a function of the current flowing through a stator power phase winding at any instant in time; said controller comprising:

circuit means to which is applied a speed set voltage which is a function a desired RPM of the rotor of the motor and an actual speed voltage which a function of the actual RPM of the rotor of the motor for producing a speed error signal;

a divide by "n" counter circuit having an input terminal and an output terminal:

phase-locked loop (PLL) circuit means including a first signal input terminal to which is applied the Me signal produced by the motor controlled by the controller, a phase comparator input terminal, and a voltage-controlled oscillator (VCO) which produces a pulse width modulation (PWM) signal;

circuit means for applying the PWM signal produced by the VCO to the input terminal of the divide by "n" counter circuit, the divide by "n" counter circuit producing power phase commutation signals at its output terminal;

circuit means for connecting the output terminal of the divide by "n" counter to the phase comparator input terminal of the PLL;

an up/down counter circuit to which is applied the power phase commutation signals for producing power phase enable signals for each of the power phase windings of the motor;

PWM duty cycle control means to which is applied the speed error signal and the torque feedback signals produced by the motor for varying the duration of the power on portion of each pulse of the PWM signal as a function of the difference between the speed error signal and the torque feedback signals for producing PWM power drive signals, the frequencies of which are the same as the frequency of the PWM signal at the VCO output terminal of the PLL; and logic and power switch control circuit means to which is applied the PWM power drive signals from the PWM duty cycle control means and the phase enable signal produced by the divide by "n" counter for applying PWM power drive signals to the power circuit means of the motor to energize the phase winding sequentially and in synchronization with the rotation of the rotor.

19. The pulse width modulation controller of claim 18 in which "n" is a positive integer.

20. The pulse width modulation controller of claim 19 in which "n" equals five.

* * * * *